US008000573B2

(12) United States Patent
Roscoe

(10) Patent No.: US 8,000,573 B2
(45) Date of Patent: Aug. 16, 2011

(54) GENERIC TOW LEAD-IN FOR STREAMERS

(76) Inventor: Phil Roscoe, Leiderdorp (NL)

( * ) Notice: Subject to any disclaimer, the term of this patent is extended or adjusted under 35 U.S.C. 154(b) by 0 days.

(21) Appl. No.: 12/063,208

(22) PCT Filed: Aug. 15, 2005

(86) PCT No.: PCT/NO2005/000290

§ 371 (c)(1),
(2), (4) Date: Dec. 12, 2008

(87) PCT Pub. No.: WO2007/021192

PCT Pub. Date: Feb. 22, 2007

(65) Prior Publication Data

US 2009/0214168 A1 Aug. 27, 2009

(51) Int. Cl.
*G02B 6/44* (2006.01)

(52) U.S. Cl. ........ 385/101; 385/100; 385/102; 385/103; 385/104; 385/105; 385/106; 385/107; 385/108; 385/109; 385/110; 385/111; 385/112; 385/113; 385/114

(58) Field of Classification Search ........... 385/100–114
See application file for complete search history.

(56) References Cited

U.S. PATENT DOCUMENTS

| | | | | |
|---|---|---|---|---|
| 4,597,065 | A * | 6/1986 | Lien et al. | 367/20 |
| 4,952,012 | A * | 8/1990 | Stamnitz | 385/101 |
| 6,426,464 | B1 * | 7/2002 | Spellman et al. | 174/101.5 |
| 2006/0239122 | A1 * | 10/2006 | Vigen et al. | 367/131 |
| 2009/0141587 | A1 * | 6/2009 | Welker et al. | 367/16 |

FOREIGN PATENT DOCUMENTS

| | | | |
|---|---|---|---|
| DE | 102 39 695 | C | 11/2003 |
| EP | 0957494 | A | 11/1999 |

* cited by examiner

*Primary Examiner* — Brian M. Healy
*Assistant Examiner* — Guy G Anderson
(74) *Attorney, Agent, or Firm* — Frommer Lawrence & Haug LLP; Ronald R. Santucci

(57) ABSTRACT

Generic tow lead-in for streamers providing communication between the seismic systems and the streamers, consisting of at least four wire power quad, at least four multimode optical fibers and at least one signal pair, where the at least one signal line do not utilize a screen.

11 Claims, 2 Drawing Sheets

Figure 3:
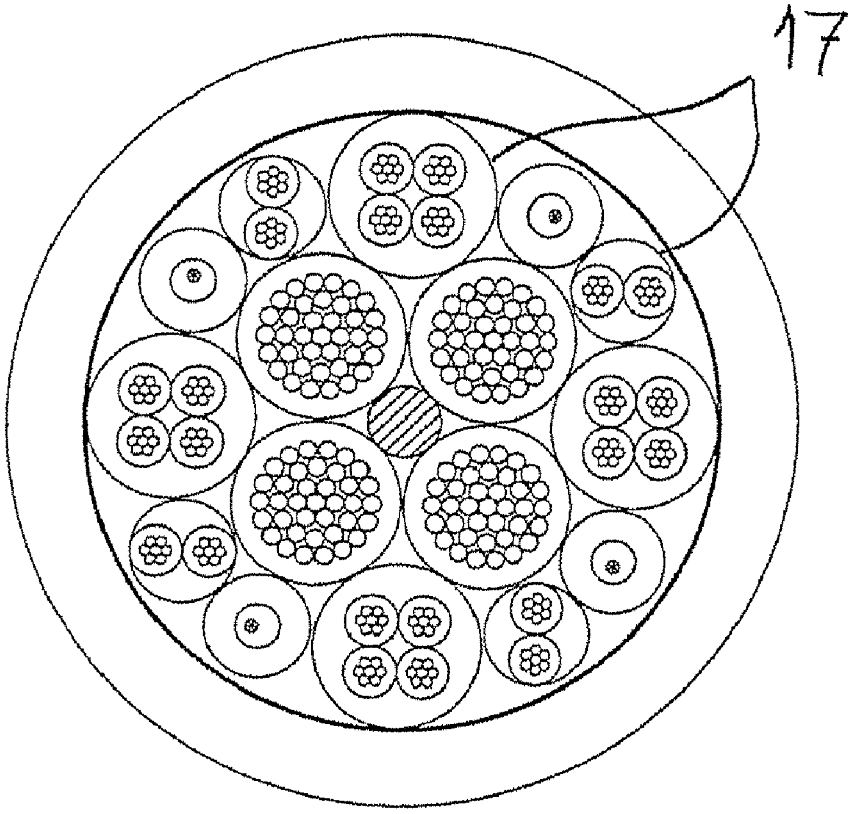
Fig. 3 Prior Art

Fig. 1
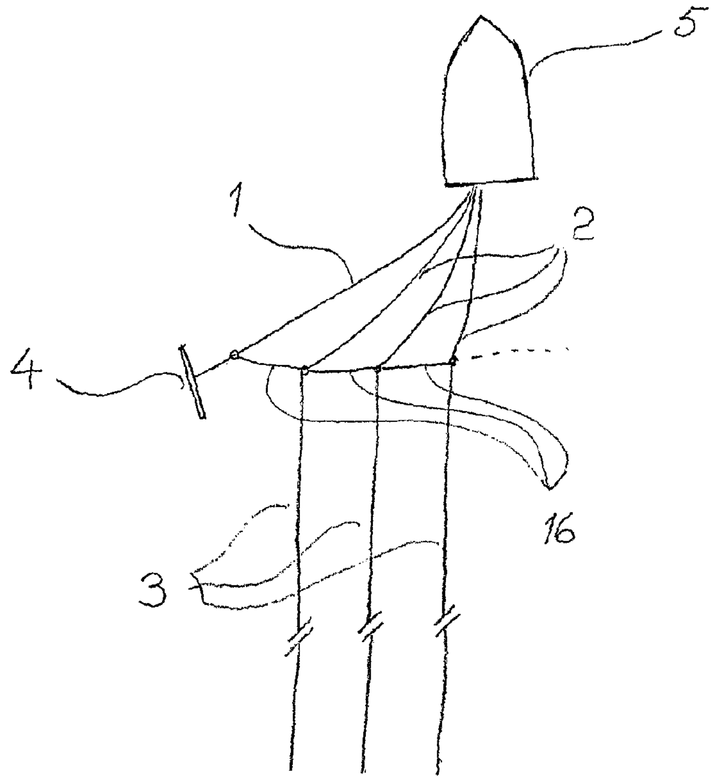
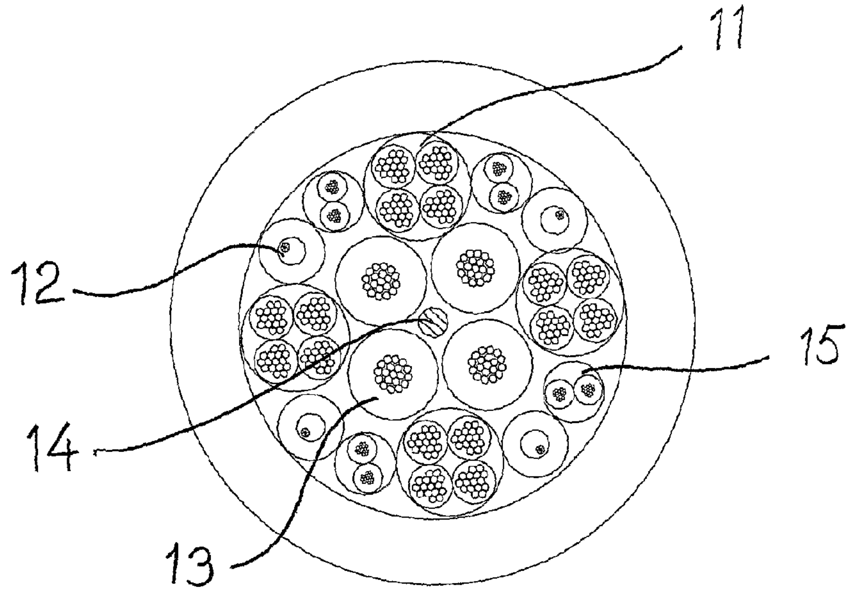
Fig. 2

GENERIC TOW LEAD-IN FOR STREAMERS

This is a 371 filing of International Patent Application No. PCT/NO2005/000290 filed Aug. 15, 2005 and published on Feb. 22, 2007 under publication number WO 2007/021192 A.

The present invention is related to a generic tow lead-in for streamers according to the preamble of the claims.

3D seismic surveys are today carried out by vessels towing multiple streamers, e.g. cables that contain a number of hydrophone groups along the length of the streamers. The lengths deployed are in the range of from 600 up to a maximum today of 12 000 meters per cable. The number of cables deployed at any one time can be anything from 2 to 20 and this figure is increasing.

The lead-in cables provide a link between the streamer winch and the actual streamer. Such cables are typically triple layer armoured and are designed to withstand the harsh environment, encountered at the forward end of the streamer towed array. There are also short lengths of streamer of 100 meters each at the forward and aft end of the streamer. These sections have a stretch facility and absorb the axial tugging encountered at sea. Lead-ins are armoured cables, used to link the streamer to the vessel. They do not carry hydrophones, but comprise power supply, auxiliary conductors and fibre optic data transmission lines.

A paravane is a device that when tethered to a fixed object, and has a moving fluid across its surface, produces a lift force, and a drag force. A fixed bridle tows the paravanes, and the angle to the flow can be varied to achieve the required adjustment of lift force. They are normally towed just below the surface of the water, and have stability as a result of centre of buoyancy being above the centre of gravity.

Paravanes are used to provide separation at the head of the streamers, the head being the vessel end of the towed array. These forward paravanes may have lift figures close to 15 tonnes and can have a surface area of up to 40 square meters.

Typical survey speed on vessels towing multiple streamers is today 4-5 knots. The speed is limited by the transverse forces acting on the tow lead-in, in particular the outermost ones, as they have the steepest angle relative to the vessel direction. Furthermore, it happens that the bridle for the paravanes break and then the forces taken up by the bridle is transferred to the tow lead-in cables. The above mentioned forces have resulted in a very robust design of the tow lead-in cables, to prevent them from snapping due to a sudden increase in tension due to snapping of the bridle for at least one of the paravanes, mainly based on trial and error. Thus leading to cables with bigger/greater diameters which again limit the speed of the vessel.

The above mentioned disadvantages with prior art tow lead-in cables are avoided with the tow lead-in according to the present invention as defined by the features stated in the claims.

The drawing discloses in

FIG. 1 schematically a prior art streamer deploy showing only streamers on one side behind a vessel, FIG. 2 discloses a cross section of the tow lead-in cable according to present invention and FIG. 3 show a typical optic-electric core for use in tow lead-in cables for the seismic exploration and defence market.

Most seismic surveys are carried out in the way shown in FIG. 1. A vessel 5 is towing one or several streamers 3 with lengths between 600 and 12000 meters per cable. Tethers 16 are used at the front end of the streamers to maintain a constant distance between the streamers. The paravane 4 pull the streamers transversely relative to the direction of the vessel so as to increase the amount of cables that can be deployed in an seismic survey. To guide the paravane 4, a bridle 1 is connected between the paravane 4 and the vessel 5, and is designed to withstand high tensile forces. The tow lead-in 2 is connected between the streamers 3 and the vessel 5 and provide the streamers 3 with power and the means to communicate with the seismic equipment onboard the vessel.

The leading system providers on the market, like MSX, Syntrak and Seal, put forward certain requirements as to the power-, signal- and data-lines so that all the products on the streamer are able to function properly. These requirements are minimum resistance for the power line; attenuation, frequency and transmission length for the signal line; and four multimode optical fibres for the data lines.

To be able to reduce the size/diameter of the tow lead-in, one has to look at the core to see if the parts concerning these system requirements can be altered and the need for reinforcement for strength to withstand the maximum tension acting on it. Given the power line 13 and optical fibre components 12, cable size reduction can only be achieved by reducing the signal component sizes 11,15 and increasing the space effectiveness of the cable geometry.

The losses in a signal line 11,15 are composed of three elements, the conductor wire losses (loop resistance), the dielectric losses (insulation type), and the screen losses. By eliminating the signal line screen a higher resistance wire pair can achieve the same attenuation as previously.

The prime reason for screening 17 signal lines, is the reduction of noise from other adjacent lines. This is commonly referred to as cross-talk. Cross-talk is the logarithmic ratio of the power induced on one line with respect to the power transmitted on another line. It is given the units bels, or more frequently decibels (one tenth of a bel).

The electrical-optical core is geometrically constructed such that the cable is symmetrical and minimises differential cross-talk. The cable is also constructed in a uni-lay form to minimise diameter. A typical electrical-optical core is shown in FIG. 3. To ensure structural stability under radial compression, the signal quads 11 and pairs 15 are individually belt fill extruded to a round shape. To ensure good fatigue life the signal conductors are manufactured from high tensile copper-cadmium alloy. The core is further reinforced for strength with at least one layer for strength which can be of high tensile steel, aramid fibre, PBO fibre, or HMWPE fibre. An outer sheath may be applied for protection, though this is optional for steel armoured cables.

Under testing it was found that the crosstalk between the central power quad and signal pairs is better than 90 dB for frequencies up to 5 kHz. The crosstalk between quads and pairs is better than 60 dB for frequencies up to 500 kHz. These results are measured over a 1000 m cable. Testing of cables with common/individual screen give similar results. The key difference between cables with and without screen is the size. The size and shape of the cable has consequence on the drag force and the vortex induced vibrations when towed in water with an angle relative to the direction of motion.

To meet the attenuation and crosstalk levels seen with a screened or shielded unit would result in a component nearly twice as large. The new core cable has a diameter some 70% of what would be expected and a cross-sectional area some 50% of what would be expected.

The cable is suitable for systems using power lines from DC up to 5 kHz, and where up to 12 signal lines 11,15 are required. The construction also contains 4 optical fibres 12, though this could be extended to 8 optical fibres when two fibres per tube are used.

FIG. 2 shows one embodiment according to this invention where the core from FIG. 3 is used as basis to optimise the diameter of the cable. In this embodiment the core is further reinforced for strength with two layers of high tensile steel and an outer sheath have been applied for protection.

The cable according to the invention can be used in any application requiring transmission of signal, data, and power where diameter and performance are at a premium.

The invention claimed is:

1. Generic tow lead-in for streamers providing communication between seismic systems and the streamers, consisting of at least four wire power quad, at least four multimode optical fibres and at least one signal pair, wherein the at least one signal pair does not utilize a screen and has a resistance of the signal pair increased to compensate for an attenuation change from a signal pair utilizing a screen.

2. Generic tow lead-in according to claim 1, wherein the core is covered with at least one reinforcement layer for strength.

3. Generic tow lead-in according to claim 2, wherein the at least one reinforcement layer is high tensile steel.

4. Generic tow lead-in according to claim 2, wherein the at least one reinforcement layer is aramid fibre.

5. Generic tow lead-in according to claim 2, wherein the at least one reinforcement layer is PBO fibre.

6. Generic tow lead-in according to claim 2, wherein the reinforcement layer is HMWPE fibre.

7. Generic tow lead-in according to claim 1, wherein the crosstalk between the central power quad and signal pairs is better than 90 dB for frequencies up to 5 kHz.

8. Generic tow lead-in according to claim 1, wherein the crosstalk between the quad and signal pairs is better than 60 dB for frequencies up to 500 kHz.

9. Generic tow lead-in according to claim 1, wherein the cable can be used for systems using power lines from DC up to 5 kHz.

10. Generic tow lead-in for streamers providing communication between seismic systems and the streamers, comprising;

at least four wire power quad;

at least four multimode optical fibres; and a plurality of signal pairs, at least one signal pair having a screen, wherein at least one signal pair does not have a screen and wherein a diameter of the tow lead-in is reduced by the at least one signal pair not having a screen.

11. Generic tow lead-in for streamers providing communication between the seismic systems and the streamers, the lead-in having power conductors, a plurality of multimode optical fibers, and a plurality of signal pairs with screens wherein the improvement comprises a diameter of the tow lead-in being reduced by at least one of the signal pairs not having a screen.

* * * * *